United States Patent [19]

Goudriaan et al.

[11] 4,032,474

[45] June 28, 1977

[54] PROCESS FOR THE FLUORIDING OF A CATALYST

[75] Inventors: Frans Goudriaan; Pieter B. Kwant, both of Amsterdam, Netherlands

[73] Assignee: Shell Oil Company, Houston, Tex.

[22] Filed: Apr. 5, 1976

[21] Appl. No.: 673,519

[30] Foreign Application Priority Data

Apr. 18, 1975 Netherlands .................... 7504620

[52] U.S. Cl. .............................. 252/441; 252/442
[51] Int. Cl.$^2$ ........................................ B01J 27/12
[58] Field of Search .......................... 252/441, 442

[56] References Cited

UNITED STATES PATENTS

| | | | |
|---|---|---|---|
| 2,568,964 | 9/1951 | Montgomery et al. | 252/441 X |
| 2,645,605 | 7/1953 | Lang et al. | 252/441 X |
| 2,848,380 | 8/1958 | Thomas | 252/441 X |
| 2,939,897 | 6/1960 | Beber et al. | 252/441 X |
| 3,137,656 | 6/1964 | Mason et al. | 252/441 X |
| 3,435,085 | 3/1969 | White et al. | 252/442 X |
| 3,663,454 | 5/1972 | Suggitt et al. | 252/441 X |

*Primary Examiner*—Patrick P. Garvin
*Attorney, Agent, or Firm*—Ronald R. Reper

[57] ABSTRACT

A process is disclosed for "in-situ" fluoriding of catalyst in a fixed bed wherein an amount of a fluorine is provided which is in excess by at least an average of 10%w of the amount of fluorine absorbed by the catalyst resulting in more efficient, uniform catalyst.

8 Claims, No Drawings

PROCESS FOR THE FLUORIDING OF A CATALYST

BACKGROUND OF THE INVENTION

The invention relates to a process for the fluoriding of a catalyst.

For a number of catalytic processes, the suitability of the catalyst can be improved by incorporating fluorine therein. Incorporation of fluorine in catalysts can basically be effected in two manners. Fluorine can be incorporated in the catalysts during their preparation, for example by impregnation of the carrier with a suitable fluorine compound. It is also possible to incorporate fluorine in the finished catalyst prior to or during the initial phase of the process for which the catalyst is utilized, by addition of a suitable fluorine compound to a stream of gas and/or liquid which is passed over the catalyst. If desired, the latter fluoriding technique, which is generally referred to as in-situ fluoriding, may be combined with the impregnation technique mentioned before.

During in-situ fluoriding, fluorine produced by decomposition of the utilized fluorine compound under the prevailing reaction conditions is absorbed by the catalyst. In practice, the in-situ fluoriding process is continued until the catalyst has absorbed the calculated quantity of fluorine. In this case the conditions are so chosen that virtually all the fluorine supplied to the catalyst is in fact absorbed thereby.

During an investigation carried out by the applicant into the in-situ fluoriding of a fixed bed of catalyst particles, it has been established that the above-described technique as a rule leads to a non-uniform distribution of fluorine over the catalyst bed, with an excess of fluorine in the first part of the bed and a deficiency thereof in the final part of the bed. In processes where optimum catalyst performance is dependent on a given minimum quantity of fluorine on the catalyst, a non-uniform distribution of fluorine over the catalyst bed causes no harm, provided that the requisite minimum quantity of fluorine is present throughout the catalyst bed. In most cases, however, optimum catalyst performance is dependent on a given fixed fluorine content and the performance of the catalyst is worse if its fluorine content is above or below that fixed level.

SUMMARY OF THE INVENTION

It has been found that during the in-situ fluoriding of a fixed bed of catalyst particles a uniform distribution of fluorine over the bed can be obtained if use is made of a constant fluorine slip through the bed combined or not combined with a positive temperature gradient over the bed, the conditions to be met being as follows:

a. The average fluorine slip ($S_A$) should be at least 10%w. A fluorine slip is defined as the percentage by weight of the supplied quantity of fluorine which is not absorbed by the catalyst bed. Because of the fact that during the initial and the final stage of the in-situ fluoriding, as well as, to a lesser degree, during the course of the in-situ fluoriding fluctuations in the fluorine slip cannot be avoided, the concept of "in-situ fluoriding with the use of a constant fluorine slip" should not be taken in too strict a sense and it should be taken to comprise also an in-situ fluoriding in which for at most 20% of the period of in-situ fluoriding a fluorine slip occurs that differs from the slip applied during the remaining period, which slip has a fixed value ($S_F$). The average fluorine slip $S_A$ is given by the formula $S_A = \frac{\Sigma S_n \cdot (\Delta t)_n}{t}$, where $S_n$ is the constant fluorine slip over a period $(\Delta t)_n$ and $t$ is the total duration of time of the process of in-situ fluoriding. For the theoretical case where in an in-situ fluoriding with application of a constant fluorine slip the fluorine slip has the fixed value $S_F$ throughout the in-situ fluoriding, $S_G$ is naturally equal to $S_F$.

b. The temperature gradient (G) should be at most 30° C and the product of $S_A$ (in %w) and G (in °C) should be at most 1000. The temperature gradient is defined as the temperature difference between the end and the beginning of the catalyst bed. If the catalyst is distributed over several beds the temperature gradient should be taken to mean the temperature difference between the end of the last bed and the beginning of the first bed.

c. If a constant fluorine slip which on average amounts to less than 50%w is used, for a uniform distribution of fluorine over the catalyst bed to be obtained it is necessary to use a temperature gradient as well. This temperature gradient should be at least $300/S_A$ if $S_A$ is less than 40%w, and should be at least $3/4 (50-S_A)$ if $S_A$ is at least 40%w and less than 50%w.

d. If a constant fluorine slip which on average amounts to at least 50%w is used, application of a temperature gradient in order to obtain a uniform distribution of fluorine over the catalyst bed may be omitted.

DESCRIPTION OF PREFERRED EMBODIMENTS

The term a "uniform distribution of fluorine over the catalyst bed" herein refers to a distribution of fluorine in which the quotient of the fluorine content of the catalyst at the end of the catalyst bed ($F_2$) and the fluorine content of the catalyst at the beginning of the catalyst bed ($F_1$) may vary between 0.5 and 1.5.

In the practical application of in-situ fluoriding using a fluorine slip, it is desirable to keep the fluorine slip as small as possible, inter alia for the following four reasons. First, from the point of view of fluorine utilization it is desirable that as much as possible of the fluorine fed to the reactor should actually be emplaced on the catalyst. Secondly, if the quantity of fluorine fed to the reactor containing the catalyst bed per unit remains the same, the time required for the in-situ fluoriding will be shorter according as a smaller fluorine slip is applied. Finally, it is desirable from the point of view of possible corrosion that as little fluorine as possible comes into the equipment after the reactor. With respect to the second and third points noted above it may be observed that these are especially important when the in-situ fluoriding is carried out in the initial stage of the process for which the catalyst is used. For, during the in-situ fluoriding the properties of the catalyst will be changing and so will the properties of the product discharged during this period. It is therefore desirable to keep this period as short as possible. In addition, all the fluorine that is not absorbed by the catalyst comes into the product and has to be removed from it. This is another reason why it is important that the largest possible proportion of the fluorine fed to the reactor should be left behind in the catalyst.

Unfortunately, however, the above-mentioned requirement, according to which a small constant fluorine slip should always be accompanied by a positive temperature gradient whose minimum value should be larger according as the fluorine slip applied is smaller.

In fact, it has been found that the generation of a temperature gradient through the catalyst bed and its maintenance throughout the in-situ fluoriding are difficult to realize in processing on a technical scale and become even more difficult according as a larger temperature gradient is required. This is so because reactors meant for operation on a technical scale are generally constructed so that no heat can be supplied to the process or removed from it via the reactor wall. The facts given hereinbefore imply that the process mentioned above, in which use is made of a constant fluorine slip between 10 and 50%w, which process can be realized without difficulty on a laboratory or on a semi-technical scale, will meet with serious problems when applied on a technical scale.

It has been found that in the in-situ fluoriding with the use of a fluorine slip between 10 and 50%w, a uniform distribution of fluorine over the catalyst bed can be obtained without the need of also applying a temperature gradient, if instead of a constant fluorine slip a variable fluorine slip is applied. Just as for the process mentioned above, it also holds for the latter process that the average slip applied should be at least 10%w. In the latter process, when a variable fluorine slip is applied, both in the low slip range (10–50%w) and in the high slip range (>50%w) a positive temperature gradient of at most 30° C may be applied, if desired. Just as in the process mentioned above, the maximum value of this gradient is again determined by the condition that the product of $S_A$ and G should be at most 1000.

If the in-situ fluoriding with the use of a constant fluorine slip is defined as a process in which a certain fixed fluorine slip occurs at least 80% of the time, in-situ fluoriding with the use of a variable fluorine slip may be defined as a process in which a certain fixed fluorine slip occurs less than 80% of the time.

The present patent application therefore relates to a process for the fluoriding of a catalyst, in which process a fixed bed of catalyst particles is fluorided in-situ with the use of a constant or variable fluorine slip through the catalyst bed combined or not combined with a positive temperature gradient over the bed, provided that a. the average fluorine slip ($S_A$) amounts to at least 10%w, b. the temperature gradient (G) amounts to at most 30° C, c. the product of $S_A$ (in %w) and G (in °C) amounts to at most 1000, d. a constant fluorine slip which on average amounts to less than 40%w is accompanied by a temperature gradient of at least $300/S_A$, and e. a constant fluorine slip which on average amounts to at least 40%w but less than 50%w is accompanied by a temperature gradient of at least $3/4 (50-S_A)$.

If in the process according to the invention a constant fluorine slip is used which on average amounts to less than 40%w, it is preferred that it is accompanied by a temperature gradient of at least $3/4 (50-S_A)$. If a temperature gradient is used in the process according to the invention, the said gradient should be at most 30° C. Preferably, the temperature gradient should be less than 25° C and in particular less than 20° C. If in the process according to the invention use is made of a fluorine slip and, in addition, of a temperature gradient, this temperature gradient should be chosen that the product of average slip and gradient is at most 1000.

Preferably, in those cases where an average fluorine slip of less than 50%w is used in combination with a temperature gradient, such a temperature gradient is chosen that the product of average slip and gradient is between 400 and 900 and in particular between 500 and 800. In those cases where an average fluorine slip of at least 50%w is used in combination with a temperature gradient, it is preferable to choose such a temperature gradient that the product of average slip and gradient is between 100 and 900, and in particular between 200 and 800.

The process according to the invention is in general suitable for obtaining a uniform fluorine distribution in the in-situ fluoriding of a fixed bed of catalyst particles. The process is above all of importance for the in-situ fluoriding of a fixed bed of catalyst particles which contain one or more metals having hydrogenative activity, supported on a carrier. Preferred are supported catalysts containing one or more metals from Groups VIB, VIIB and VII. As catalytically active metal component the catalysts may contain both one or more noble metals and one or more base metals. Catalysts having as catalytically active metal component one or more noble metals generally contain 0.5–5 parts by weight and preferably 0.1–2 parts by weight of metal per 100 parts by weight of carrier. Very suitable noble metals are palladium and platinum. The catalysts which contain as catalytically active metal component one or more noble metals are preferably used in reduced form. Catalysts having as catalytically active metal component a base metal of a combination of base metals, generally contain 1–150 parts by weight per 100 parts by weight of carrier. The quantity of metal which must be present on these catalysts is to a large extent determined by the nature of the process for which the catalyst is intended. Very suitable metal combinations consist of one or more metals or Groups VIB and VIIB and, in addition, one or more metals from the iron group; particularly suitable are combinations which contain molybdenum and/or tungsten and, in addition, nickel and/or cobalt. The catalysts which contain as catalytically active metal component one or more base metals are preferably used in sulphided form. Suitable carriers for the present catalysts are both amorphous and crystalline materials. Examples of amorphous carriers are oxides of the elements from groups II, III and IV of the Periodic System, such as silica, alumina, magnesia, zirconia and mixtures of these oxides such as silica-alumina and silica-zirconia. Examples of crystalline carriers are zeolites, such as faujasite. If desired, mixtures of amorphous and crystalline materials may also be used as carriers.

The quantity of fluorine applied to the catalysts in the process according to the invention may vary within wide limits, depending inter alia on the catalytically active metal component which is present on the catalyst and the purpose for which it is desired to use the catalyst. If the catalyst contains one or more nobile metals, the quantity of fluorine is preferably 0.1–7.5 parts by weight and in particular 0.5–5 parts by weight per 100 parts by weight of carrier material.

As has been remarked above, the in-situ fluoriding of a catalyst is effected by adding, before or during the initial phase of the process in which the catalyst is used, a suitable fluorine compound to a stream of gas and/or liquid which is passed over the catalyst. By preference, the in-situ fluoriding of the catalyst is carried out by addition of a suitable fluorine compound to a stream of liquid which is passed over the catalyst. If the in-situ fluorided catalyst is intended to be used for a liquid feed, as is generally the case in the conversion of hydrocarbon fractions, the feed itself can very suitably serve as the stream of liquid to which the fluorine compound is added. If desired, during in-situ fluoriding it is also possible to pass another stream of liquid than the feed over the catalyst. If, for example, the in-situ fluorided catalyst is intended to be used in preparation of light hydrocarbon distillates such as gasoline, by hydrocracking of a heavy hydrocarbon oil such as a flashed distillate, it is possible to use both the flashed distillate to be converted and a lighter hydrocarbon oil, such as a kerosene or gas oil fraction, as the stream of liquid which is passed over the catalyst during in-situ fluoriding. The addition of the fluorine compound to the stream of liquid which is passed over the catalyst is continued until the catalyst has absorbed the requisite quantity of fluorine. The fluorine compound may be added as such to the stream of liquid or in the form of a concentrate, for example in a light hydrocarbon fraction. It is preferred to use an organic fluorine compound as fluoriding agent. Examples of suitable organic fluorine compounds for this purpose are orthofluorotoluene and difluoroethane.

The conditions under which the in-situ fluoriding according to the invention is carried out may vary within wide limits, dependent, inter alia, on the nature of the stream of liquid which is passed over the catalyst and the average fluorine slip desired. Suitable conditions for carrying out the in-situ fluoriding according to the invention are a temperature of 100°–400° C, a pressure of 5–200 bar, a space velocity of 0.5–5 liters of stream of liquid per liter of catalyst per hour and a hydrogen/stream of liquid ratio of 200–2000 Nl/l.

The total quantity of fluorine to be added to the stream of liquid during in-situ fluoriding depends on the quantity of catalyst to be fluorided, the requisite fluorine content of the catalyst and the average fluorine slip used. The in-situ fluoriding is preferably carried out by continuously adding a fluorine compound to the liquid which is passed over the catalyst, until the calculated total quantity of fluorine has been added. At a given space velocity the time required for the introduction of a given quantity of fluorine into the catalyst depends on the used concentration of the fluorine compound in the liquid and on the average fluorine slip used. The higher the concentration of the fluorine compound in the liquid and the smaller the average fluorine slip, the shorter the time required for the in-situ flouriding. During in-situ fluoriding of the catalyst, preferably a quantity of 20–2000 ppmw and in particular of 50–1000 ppmw of fluorine in the form of a fluorine compound is added to the stream of liquid.

As has been explained above, an average fluorine slip of at least 10% by weight should be used in the method according to the invention. The quantity of fluorine which is not absorbed by the catalyst depends on the nature of the fluoriding agent used and on the nature of the catalyst to be fluorided and further on the reaction conditions used during in-situ fluoriding and on the nature of the liquid which is passed over the catalyst. As a general rule, for a given fluoriding agent and catalyst the fluorine slip will be larger according as the in-situ fluoriding is carried out at a lower temperature and pressure and a higher space velocity and according as the liquid which is passed over the catalyst has a higher nitrogen and aromatic content. Consequently, for a given fluoriding agent, catalyst and liquid which is passed over the catalyst, it is possible by means of a number of simple experiments to determine the fluorine slip occurring under certain reaction conditions and subsequently determine how the reaction conditions should be modified in order to achieve a desired slip.

A variable fluorine slip in the process according to the invention can be realized at reaction conditions that otherwise remain the same, inter alia by varying the quantity of fluorine that is supplied to the catalyst per unit time during the in-situ fluoriding. An increase in the quantity of fluorine supplied to the catalyst causes the fluorine slip to increase, whereas a decrease in the quantity of fluorine supplied to the catalyst causes the fluorine slip to diminish. A variation of the quantity of fluorine that is supplied to the catalyst during the in-situ fluoriding per unit time can be achieved by increasing or decreasing the concentration of the fluorine compound in the liquid that is passed over the catalyst. A variation of the quantity of fluorine that is supplied to the catalyst during the in-situ fluoriding per unit time can also be achieved by recycling at least part of a fluorine-containing gas phase separated from the reaction product. The fluorine slip is higher according as more gas with a higher fluorine content is recycled. A variable fluorine slip can also be realized during the in-situ fluoriding by varying the reaction conditions and/or the composition of the liquid that is passed over the catalyst while the quantity of fluorine that is supplied per unit time to the catalyst is kept constant. An increase of the temperature and/or the pressure and/or the aromatics content of the liquid that is passed over the catalyst reduces the fluorine slip, whereas a decrease of the temperature and/or the pressure and/or an increase of the space velocity and/or the nitrogen content and/or the aromatics content of the liquid that is passed over the catalyst causes the fluorine slip to increase.

If in the process according to the invention use is made of a fluorine slip and, in addition, of a temperature gradient, this temperature gradient must be positive, i.e. the temperature at the end of the catalyst bed must be higher than that at the beginning of the catalyst bed and moreover the temperature of the catalyst should display a uniform rise along the direction of flow of the feed through the bed. The temperature gradient should be at most 30° C.

The desired temperature gradient may be effected in the process according to the invention in various manners, according to the conditions under which the in-situ fluoriding is carried out. In general if may be stated that the desired temperature gradient either occurs as such during the in-situ fluoriding or has to be set by the addition of heat to the catalyst bed or by the removal of heat from the catalyst bed. This may be explained in more detail as follows. As has been stated above, when using, for example, the in-situ fluorided catalyst for the conversion of a flashed distillate into gasoline by hydrocracking, it is possible to use as liquid which is passed over the catalyst during the in-situ fluoriding, both the flashed distillate to be converted and a kerosene fraction. Since the quantity of heat generated when carrying out in-situ fluoriding under mild conditions is generally fairly small, heat will have to be supplied to the catalyst bed, particularly if a fairly strong temperature gradient is desired. The most severe conditions are under which the in-situ fluoriding is carried out, the more heat there will be generated and situations may occur in which the desired temperature gradient occurs as such or in which even so much heat is generated that heat has to be removed from the catalyst bed in order to maintain the desired temperature gradient. The three above-mentioned possibilities can occur both if kerosene is used as liquid which is passed over the catalyst during the in-situ fluoriding and if flashed distillate to be converted is used for this purpose. A special situation can also occur if during the in-situ fluoriding the flashed distillate is used as the liquid which is passed over the catalyst and if the conditions during in-situ fluoriding are so chosen that even at this stage some of the feed is already converted by hydrocracking. As more cracking occurs, so more heat will be generated and consequently more heat will have to be removed from the catalyst bed in order to maintain the desired temperature gradient.

The process according to the invention is very suitable to be used for in-situ fluoriding of catalyst which contain one or more metals having hydrogenative activity and supported on a carrier, when using these catalysts for the conversion of hydrocarbon fractions at elevated temperature and pressure and in the presence of hydrogen. Examples of such processes in which in-situ fluoriding catalysts according to the invention are preferably used are as follows:

1. The hydrocracking of heavy hydrocarbon oils, such as flashed distillate for he preparation of light hydrocarbon distillates such as gasolines and kerosenes.
2. The preparation of high-viscosity-index lubricating oils by means of a catalytic hydrogen treatment of heavy hydrocarbon oils such as deasphalted oils and oil-containing paraffin mixtures.
3. The hydrogenation of aromatics present in light unbranched paraffins present in light hydrocarbon oil distillates in order to increase the octane number of these distillates.

The invention will now be elucidated with reference to the following examples.

EXAMPLE I

Starting from six catalyst base materials (A–F), 13 different catalysts were prepared by in-situ fluoriding. The in-situ fluoriding was carried out by passing a liquid, to which a certain quantity of a fluorine compound had been added, for a given time at elevated temperature and pressure and in the presence of hydrogen, over a catalyst base material which was present in the form of a fixed bed in a cylindrical reactor. The liquids used were two heavy gas oils (HGO and HGO*), a deasphalted residual hydrocarbon oil (DAO) and a kerosene (KER). The fluorine compounds used were 1,1-difluoroethane (DFE) and orthofluorotoluene (OFT). In all cases except for experiments 8 and 13 a constant fluorine slip through the bed was used either combined or not combined with a positive temperature gradient over the bed. The in-situ fluoriding was continued until the catalyst had absorbed the desired quantity of fluorine. On completion of the in-situ floriding, the fluorine content at the beginning of the catalyst bed ($F_1$) and the fluorine content at the end of the catalyst bed ($F_2$) was determined. The composition of the catalyst base materials A-F is stated in Table I. Some properties of the liquids used are stated in Table II. The conditions under which the in-situ fluoriding experiments were carried out are stated in Table III, together with the value measured for $F_1$ and $F_2$.

Table I

| Catalyst base material, No. | Composition, parts by wt per 100 parts by wt of alumina carrier | | | |
|---|---|---|---|---|
| | Nickel | Molybdenum | Tungsten | Phosphorus |
| A | 3.8 | 16.0 | — | 4.0 |
| B | 11.0 | 18.0 | — | — |
| C | 4.2 | 17.7 | — | 2.8 |
| D | 4.1 | 16.8 | — | 4.2 |
| E | 5.0 | — | 30.0 | — |
| F | 10.0 | — | 60.0 | — |

Table II

| Liquid which is passed over the catalyst base material during in-situ fluoriding | Nitrogen content of the liquid, ppmw | Poly($\geq$tri)-aromatic content in mol/100 g |
|---|---|---|
| HGO | 160 | 9 |
| HGO* | 200 | 11 |
| DAO | 640 | 35 |
| KER | 3 | — |

Table III

| | | Exp. No. | 1 | 2 | 3 | 4 | 5 | 6 | 7 |
|---|---|---|---|---|---|---|---|---|---|
| | | Catalyst base material, No. | B | A | E | C | F | B | E |
| | | Liquid | HGO | DAO | DAO | HGO* | KER | HGO | DAO |
| | | Fluorine compound | DFE | OFT | OFT | DFE | OFT | DFE | OFT |
| | | Fluorine concentration in the liquid, ppmw | 200 | 900 | 770 | 100 | 1500 | 200 | 770 |
| | | Average temp., °C | 200 | 352 | 361 | 200 | 205 | 229 | 354 |
| | | Total pressure, bar | 165 | 165 | 165 | 165 | 130 | 165 | 165 |
| Conditions during the in-situ fluoriding | | Space velocity, kg.l$^{-1}$.h$^{-1}$ | 1.0 | 0.8 | 0.8 | 1.0 | 1.48 | 1.0 | 0.8 |
| | | H$_2$/liquid ratio, Nl.kg$^{-1}$ | 1000 | 1500 | 1500 | 1000 | 1000 | 1000 | 1500 |
| | | Duration of the experiment, hours | 120 | 16 | 71 | 63 | 111 | 110 | 45 |
| | | Average fluorine slip, % w | 31 | 28 | 44 | 31 | 60 | 0.5 | 52 |
| | | Temperature gradient, °C | 20 | 18 | 20 | 20 | — | 5 | 37 |
| Fluorine content of the catalyst bed, parts by wt of F per 100 parts by wt of alumina carrier | $F_1$ | | 3.2 | 1.7 | 3.9 | 0.69 | 23 | 7.6 | 1.7 |
| | $F_2$ | | 2.5 | 1.0 | 4.3 | 0.8 | 14 | 0.14 | 2.9 |

| | Exp. No. | 8 | 9 | 10 | 11 | 12 | 13 |
|---|---|---|---|---|---|---|---|
| | Catalyst base material, No. | C | D | F | F | B | E |
| | Liquid | DAO | HGO | KER | KER | DAO | DAO |
| | Fluorine compound | OFT | DFE | OFT | OFT | OFT | OFT |
| | Fluorine concentration in the liquid, ppmw | 300 | 300 | 1500 | 1500 | 1000 | 1000 |

Table III-continued

|  |  |  |  |  |  |  |  |
|---|---|---|---|---|---|---|---|
| Conditions during the in-situ fluoriding | Average temp., °C | 375 | 215 | 300 | 210 | 365 | 400 |
|  | Total pressure, bar | 165 | 130 | 130 | 130 | 165 | 165 |
|  | Space velocity, kg.l$^{-1}$.h$^{-1}$ | 0.8 | 1.0 | 1.48 | 1.48 | 0.8 | 0.8 |
|  | H$_2$/liquid ratio, Nl.kg$^{-1}$ | 1500 | 1000 | 1000 | 1000 | 1500 | 1500 |
|  | Duration of the experiment, hours | 45 | 385 | 115 | 120 | 38 | 34 |
| Average fluorine slip, % w |  | — | 60 | 0.12 | 40 | 14 | — |
| Temperature gradient, °C |  | 30 | 20 | — | 30 | 1 | 40 |
| Fluorine content of the catalyst bed, parts by wt of F per 100 parts by wt of alumina carrier | F$_1$ | 3.5 | 5.6 | 86 | 22 | 7.3 | 7.1 |
|  | F$_2$ | 0.07 | 9.0 | 5.6 | 37 | 1.4 | 0.1 |

Of the in-situ fluoriding experiments 1–13 stated in Table III, only experiments 1–5 were carried out according to the invention. Experiments 6–13 fall outside the scope of the present patent application and are included for the purpose of comparison.

In experiments 1, 2 and 4 an average slip of between 10 and 40%w was used in combination with a gradient below 30° C, which gradient met the requirement $300/S_A \leq G \leq 1000$. In experiment 3 an average slip of between 40 and 50%w was used in combination with a gradient below 30° C, which gradient met the requirement $\frac{3}{4}C50-S_A) \leq G \leq 1000$. In experiment 5 an average slip in excess of 50%w was used without temperature gradient. In each of experiments 1–5 a uniform distribution of fluorine over the catalyst bed was obtained, featured by a quotient $F_2/F_1$ of between 0.5 and 1.5.

In experiment 6 and 10 an average slip smaller than 10%w was used. In experiment 7 a gradient above 30° C was used. Experiments 8 and 13 were carried out without a slip. In experiments 9 and 11 the product of slip and gradient was above 1000. In experiment 12 an average slip between 10 and 40%w was used in combination with a gradient, but this gradient did not meet the requirement $G \geq 300/S_A$. In each of the experiments 6–13 a non-uniform distribution of fluorine over the catalyst bed was obtained, featured by a quotient $F_2/F_1$ of above 1.5 or below 0.5.

EXAMPLE II

The in-situ fluoriding experiments 1 and 6 described in Example I were carried out on a fixed bed of catalyst base material B. In both experiments, on completion of the in-situ fluoriding the catalyst bed had an average fluorine content of 2.8 parts by weight per 100 parts by weight of alumina carrier. Both the in-situ fluorided catalyst beds were used in separate experiments for the preparation of lubricating oil by hydrocracking of an oil-containing paraffin mixture.

The paraffin mixture had the following properties:
V$_{k_{210}}$ (kinematic viscosity at 210° F): 14.99 cSt
Sulphur content: 0.32%w
Nitrogen content: 34 ppmw
Oil content (determined by dewaxing at —+° C with a mixture of methyl ethyl ketone and toluene): 34.2%w Hydrocracking of the oil-containing paraffin mixture was effected at a total pressure of 140 bar, a space velocity of 1.0 kg.l$^{-1}$.h$^{-1}$, a hydrogen/feed ration of 1500 NlH$_2$/kg of feed and such a temperature that a paraffin conversion of 65% occurred (by paraffin conversion is meant in this context:

$$\frac{\%w \text{ of paraffins in feed} - \%w \text{ of paraffins in } 390° C^+ \text{ product}}{\%w \text{ of paraffins in feed}} \times 100\%)$$

The hydrocracked product was topped off at 390° C and the 390° C$^+$ fraction was dewaxed at −30° C with a mixture of methyl ethyl ketone and toluene. The results of the two hydrocracking experiments are stated in Table IV.

Table IV

|  | Using the catalyst bed fluorided in-situ according to exp. No. | |
|---|---|---|
|  | 1 | 6 |
| Requisite temp. for reaching a paraffin conversion of 65%, °C | 383 | 390 |
| Yield of dewaxed 390° C$^+$ lubricating oil based on feed, % w | 40 | 36 |
| V$_{k_{210}}$ of the dewaxed lubricating oil cSt | 7.7 | 7.1 |

The results stated in Table IV demonstrate clearly the great importance of a uniform distribution of fluorine over the catalyst bed ($0.5 \leq F_2/F_1 \leq 1.5$). Although both the catalyst beds have the same fluorine content of 2.8 parts by weight per 100 parts by weight of alumina carrier, the catalyst bed fluorided in-situ according to the invention (cf. experiment 1 with $F_2/F_1 = 0.78$) is capable at a lower temperature of giving a higher yield of lubricating oil with a higher V$_{k_{210}}$ than the catalyst bed fluorided in-situ in the conventional manner (cf. experiment 6 with $F_2/F_1 = 0.02$).

EXAMPLE III

In in-situ fluoriding experiments 3 and 13 described in Example I were carried out on a fixed bed of catalyst base material E. In both experiments, on completion of the in-situ fluoriding the catalyst bed had an average fluorine content of 4.1 parts by weight per 100 parts by weight alumina carrier. Both the in-situ fluorided catalyst beds were used in separate experiments for the preparation of lubricating oil by hydrocracking of the above-mentioned deasphalted oil. The deasphalted oil had the following properties:
Sulphur content: . . . 2.47%w
Nitrogen content: . . . 640 ppmw
Paraffin content: . . . 16.0%w Hydrocracking of the deasphalted oil was effected at a total pressure of 165 bar, a space velocity of 0.8 kg.l$^{-1}$.h$^{-1}$, a hydrogen/feed ratio of 1500 NlH$_2$/kg and such a temperature that the resulting base oil after topping at 390° C and dewaxing of the 390° C$^+$ fraction at −30° C with a mixture of methyl ethyl ketone and toluene had a $VI_E$ of about 130.

The results of the two hydrocracking experiments are stated in Table V.

Table V

| | Using the catalyst bed fluorided in-situ according to experiment No. | |
|---|---|---|
| | 3 | 13 |
| Requisite temperature for obtaining a dewaxed 390° $C^+$ lubricating oil with a VI of 130, ° C | 402 | 410 |
| Yield of the dewaxed lubricating oil based on feed, % w | 42 | 39 |

The results stated in Table V demonstrate clearly the great importance of a uniform distribution of fluorine over the catalyst bed ($0.5 \leq F_2/F_1 \leq 1.5$). Although both catalyst beds have the same average fluorine content of 4.1 pbw per 100 alumina carrier, the catalyst bed fluorided in-situ according to the invention (cf. experiment 3 with $F_2/F_1 = 1.1$) is capable at a lower temperature of giving a higher yield of lubricating oil than the catalyst bed fluorided in-situ in the conventional manner (cf. experiment 13 with $F_2/F_1 = 0.01$).

EXAMPLE IV

Starting from three catalysts base materials (G-I), six different catalysts were prepared by in-situ fluoriding. The in-situ floriding was carried out by passing a liquid, to which a certain quantity of 1,1-difluoroethane had been added, for a given time at elevated temperatures and pressure and in the presence of hydrogen, over the catalyst base material, which was present in the form of a fixed bed in a cylindrical reactor. The liquids used were the heavy gas oil (HGO*) and the kerosene (KER) described in Table II. In all cases a variable fluorine slip through the bed was used either combined or not combined with a positive temperature gradient over the bed. The in-situ fluoriding was continued until the catalyst had absorbed the desired quantity of fluorine. Oncompletion of the in-situ fluoriding, the fluorine content at the beginning of the catalyst bed ($F_1$) and the fluorine content at the end of the catalyst bed ($F_2$) was determined. The composition of the catalyst base materials G-I is stated in Table VI. The conditions under which the in-situ fluoriding experiments were carried out are stated in Tables VII and VIII. The values measured for $F_1$ and $F_2$ are also included in Table VII.

The following observations should be made about the conditions at which the in-situ fluoriding experiments were carried out.

All the experiments were carried out with gas recycle. To this end the reaction product was cooled to 20°-70° C, liquid and gas were separated, the gas was washed or not washed with water and then recycled. The gas, which mainly comprised hydrogen, also contained 1,1-difluoroethane, hydrogen sulphide, traces of $C_4^-$ hydrocarbons and traces of ammonia.

In experiments 14, 15 and 18 the temperatures were varied during the in-situ fluoriding.

Table VI

| Catalyst base material, No. | Composition of the catalyst base material, pbw per 100 pbw of the carrier | | | | Composition of the carrier pbw per 100 pbw of the carrier |
|---|---|---|---|---|---|
| | nickel | molybdenum | tungsten | phosphorus | |
| G | 3.6 | 14.3 | — | 3.5 | 100 $Al_2O_3$ |
| H | 7.8 | — | 25.5 | — | 24 $SiO_2 \cdot _{76} Al_2O_3$ |
| I | 3.0 | — | 9.5 | — | 75 sieve Y - 25 $Al_2O_3$ |

Table VII

| Experiment No. | 14 | 15 | 16 | 17 | 18 | 19 |
|---|---|---|---|---|---|---|
| Catalyst base material, No. | G | G | G | H | I | I |
| Liquid | HGO* | HGO* | HGO* | HGO* | KER | KER |
| Fluorine concentration in the liquid, ppmw | 300 | 300 | 300 | 300 | 225 | 150 |
| Conditions during the in-situ fluoriding | | | | | | |
| Average temp. ° C | 212.5 | 239 | 235 | 235 | 180 | 175 |
| Total pressure, bar | 130 | 130 | 130 | 130 | 125 | 125 |
| Space velocity, $kg.l^{-1}.h^{-1}$ | 1.0 | 1.0 | 1.0 | 1.0 | 2.0 | 2.0 |
| $H_2$/liquid ratio, $Nl.kg^{-1}$ | 1000 | 1000 | 1000 | 1000 | 250 | 1000 |
| Duration of the experiment, h | 430 | 250 | 170 | 250 | 542 | 340 |
| Average fluorine slip, % w | 61.5 | 31.5 | 35 | 45 | 19 | 9 |
| Temperature gradient, ° C | 15 | — | — | — | — | — |
| Fluorine content of the catalyst bed. pbw of fluorine per 100 pbw of the carrier | | | | | | |
| $F_1$ | 3.9 | 6.1 | 4.0 | 4.8 | 31.5 | 11.8 |
| $F_2$ | 6.6 | 6.0 | 3.9 | 4.3 | 26.5 | 5.6 |

Table VIII

| Experiment No. | 14 | | | | 15 | |
|---|---|---|---|---|---|---|
| Waterwash applied to the gas to be recycled | yes | | | | no | |
| Period, run hour | 0-166 | 166-262 | 262-310 | 310-430 | 0-155 | 155-250 |
| Average temperature during | | | | | | |

Table VIII-continued

| | | | | | | |
|---|---|---|---|---|---|---|
| this period, °C | 206 | 206 | 215 | 225 | 235 | 245 |
| Increase of the fluorine slip during this period, % w | 0–68 | 68–70 | 50–60 | 45–53 | 0–47 | 28–56 |
| Average fluorine slip during this period, % w | 66 | 69 | 56 | 51 | 23 | 45 |

| | | | | | |
|---|---|---|---|---|---|
| Experiment No. | 16 | 17 | 18 | | 19 |
| Waterwash applied to the gas to be recycled | yes | no | no | | no |
| Period, run hour | 0–170 | 0–250 | 0–500 | 500–542 | 0–340 |
| Average temperature during this period, °C | 235 | 235 | 175 | 200 | 175 |
| Increase of the fluorine slip during this period, % w | 0–70 | 0–50 | 0–60 | 5–10 | 0–14 |
| Average fluorine slip during this period, % w | 35 | 45 | 20 | 8 | 9 |

Of the in-situ fluoriding experiments 14–19 stated in Tables VII and VIII, experiments 14–18 were carried out according to the invention. Experiment 19 falls outside the scope of the present invention and has been included for comparison.

In experiments 14–18 an average slip above 10% was used. Furthermore, in experiment 14 such a gradient below 30° C was used that the product of average slip and gradient was smaller than 1000. In each of experiments 14–18 a uniform distribution of fluorine over the catalyst bed was obtained, characterized by a quotient $F_2/F_1$ between 0.5 and 1.5.

In experiment 19 an average slip below 10%w was used. In this experiment a non-uniform distribution of fluorine over the catalyst bed was obtained, characterized by a quotient $F_2/F_1$ smaller than 0.5.

What is claimed is:

1. A process for the fluoriding of a catalyst with an organic fluorine compound in a liquid distillate hydrocarbon in the presence of hydrogen wherein a fixed bed of catalyst particles is fluorided in-situ at a temperature of 100°–400° C, a pressure of 5–200 bar, a space velocity of 0.5–5 liters of stream of liquid distillate hydrocarbon per liter of catalyst per hour and a hydrogen/said stream of liquid ratio of 200–2000 Nl/L with the use of a constant or variable fluorine slip through the catalyst bed combined or not combined with a positive temperature gradient over the bed, provided that
   a. the average fluorine slip ($S_A$) amounts to at least 10%w,
   b. the temperature gradient (G) amounts to at most 30° C,
   c. the products of $S_A$ (in %w) and G (in °C) amounts to at most 1000,
   d. a constant fluorine slip which on average amounts to less than 40%w is accompanied by a temperature gradient of at least $300/S_A$,
   e. a constant fluorine slip which on average amounts to at least 40%w but less than 50%w is accompanied by a temperature gradient of at least ¾ (50-$S_A$) and
   f. 0.5–15 parts by weight of fluorine per 100 parts by weight of carrier are applied to the catalyst.

2. A process as in claim 1, wherein a constant fluorine slip which on average amounts to less than 40%w is used in combination with a temperature gradient of at least ¾(50-$S_A$).

3. A process as in claim 1, wherein a temperature gradient is used which is less than 25° C.

4. A process as in claim 1, wherein an average fluorine slip, $S_A$, of less than 50%w is used in combination with such a temperature gradient that the product of slip and gradient, G, is between 400 and 900.

5. A process as in claim 1, wherein an average fluorine slip of at least 50%w is used in combination with such a temperature gradient that the product of slip and gradient is between 100 and 900.

6. A process as in claim 1, wherein the catalyst contains at least one metal having hydrogenative activity, supported on a carrier.

7. A process as in claim 6, wherein the catalyst contains one or more metals of Groups VIB, VIIB and VIII of the Periodic System supported on a carrier.

8. A process as in claim 1, wherein the in-situ fluoriding of the catalyst is effected by continuously adding 20–2000 ppmw of fluorine in the form of a fluorine compound to the stream of liquid which is passed over the catalyst.

* * * * *